(12) United States Patent
Sajeepa et al.

(10) Patent No.: US 10,114,792 B2
(45) Date of Patent: Oct. 30, 2018

(54) LOW LATENCY REMOTE DIRECT MEMORY ACCESS FOR MICROSERVERS

(71) Applicant: CISCO TECHNOLOGY, INC., San Jose, CA (US)

(72) Inventors: Prabhath Sajeepa, San Jose, CA (US); Sagar Borikar, San Jose, CA (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 256 days.

(21) Appl. No.: 14/853,598

(22) Filed: Sep. 14, 2015

(65) Prior Publication Data
US 2017/0075855 A1    Mar. 16, 2017

(51) Int. Cl.
G06F 15/167    (2006.01)
G06F 15/173    (2006.01)

(52) U.S. Cl.
CPC .............................. G06F 15/17331 (2013.01)

(58) Field of Classification Search
CPC ............. G06F 11/201; G06F 15/17331; G06F 15/17337; G06F 2209/548; G06F 9/546
See application file for complete search history.

(56) References Cited

U.S. PATENT DOCUMENTS

| | | | | |
|---|---|---|---|---|
| 7,401,126 B2 * | 7/2008 | Pekkala | ................ | H04L 49/103 709/217 |
| 7,448,044 B1 * | 11/2008 | Rust | ...................... | G06F 13/385 709/203 |
| 7,620,057 B1 * | 11/2009 | Aloni | ................... | G06F 12/0804 370/395.7 |
| 7,724,678 B1 * | 5/2010 | Johnsen | ................... | H04L 43/50 370/248 |
| 7,769,913 B1 * | 8/2010 | Budhia | ............... | G06F 11/2092 370/475 |
| 7,895,286 B1 * | 2/2011 | Kilbourne, II | .......... | H04L 69/12 709/212 |
| 7,962,562 B1 * | 6/2011 | Budhia | ................. | G06F 3/0613 709/212 |
| 8,050,260 B1 * | 11/2011 | Dropps | ................. | H04L 47/125 370/237 |

(Continued)

OTHER PUBLICATIONS

"Flexible, Low Power Microservers for Lightweight Scale-Out Workloads," White Paper Intel-based Microservers, Intel Corporation, Published on or about May 16, 2015; 4 pages.

*Primary Examiner* — Shean Tokuta
(74) *Attorney, Agent, or Firm* — Polsinelli PC (57) ABSTRACT

An example method for facilitating low latency remote direct memory access (RDMA) for microservers is provided and includes generating queue pair (QPs) in a memory of an input/output (I/O) adapter of a microserver chassis having a plurality of compute nodes executing thereon, the QPs being associated with a remote direct memory access (RDMA) connection between a first compute node and a second compute node in the microserver chassis, setting a flag in the QPs to indicate that the RDMA connection is local to the microserver chassis, and performing a loopback of RDMA packets within the I/O adapter from one memory region in the I/O adapter associated with the first compute node of the RDMA connection to another memory region in the I/O adapter associated with the second compute node of the RDMA connection.

20 Claims, 5 Drawing Sheets

(56) References Cited

U.S. PATENT DOCUMENTS

| | | | | |
|---|---|---|---|---|
| 8,122,155 | B1* | 2/2012 | Marti | G06F 13/385 370/395.7 |
| 8,144,606 | B1* | 3/2012 | Viehweg | H04L 12/4625 370/249 |
| 8,566,389 | B2* | 10/2013 | Orady | G06F 3/14 709/203 |
| 8,930,507 | B2* | 1/2015 | Schmidt | G06F 9/5077 709/220 |
| 9,384,072 | B2* | 7/2016 | Manula | G06F 9/546 |
| 9,930,044 | B2* | 3/2018 | Noronha | H04L 63/101 |
| 2003/0031183 | A1* | 2/2003 | Kashyap | H04L 29/12113 370/395.2 |
| 2003/0033426 | A1* | 2/2003 | Beukema | H04L 12/18 709/234 |
| 2003/0035433 | A1* | 2/2003 | Craddock | H04L 49/90 370/429 |
| 2004/0024833 | A1* | 2/2004 | Siddabathuni | G06F 13/28 709/212 |
| 2004/0042448 | A1* | 3/2004 | Lebizay | H04L 47/12 370/362 |
| 2004/0218623 | A1* | 11/2004 | Goldenberg | H04L 12/4633 370/463 |
| 2005/0066333 | A1* | 3/2005 | Krause | G06F 9/546 719/310 |
| 2006/0230119 | A1* | 10/2006 | Hausauer | H04L 47/6265 709/216 |
| 2007/0165672 | A1* | 7/2007 | Keels | H04L 1/0061 370/474 |
| 2008/0043750 | A1* | 2/2008 | Keels | H04L 49/9094 370/395.52 |
| 2010/0232443 | A1* | 9/2010 | Pandey | H04L 49/70 370/401 |
| 2010/0332908 | A1* | 12/2010 | Johnsen | H04L 12/6418 714/39 |
| 2011/0103389 | A1* | 5/2011 | Kidambi | H04L 45/586 370/395.1 |
| 2011/0173396 | A1* | 7/2011 | Sugumar | G06F 12/0862 711/137 |
| 2012/0287944 | A1* | 11/2012 | Pandit | G06F 13/28 370/474 |
| 2012/0324068 | A1* | 12/2012 | Jayamohan | H04L 49/15 709/222 |
| 2013/0227243 | A1* | 8/2013 | Garg | G06F 9/544 711/173 |
| 2013/0254368 | A1* | 9/2013 | Guay | G06F 9/45533 709/223 |
| 2014/0059266 | A1 | 2/2014 | Ben-Michael et al. | |
| 2014/0089451 | A1* | 3/2014 | Eran | G06F 12/08 709/213 |
| 2014/0122560 | A1 | 5/2014 | Ramey et al. | |
| 2015/0012735 | A1* | 1/2015 | Tamir | G06F 9/4416 713/2 |
| 2015/0244817 | A1* | 8/2015 | Johnsen | H04L 67/16 709/223 |
| 2015/0263887 | A1* | 9/2015 | Sajeepa | H04L 41/0803 709/220 |
| 2015/0271244 | A1* | 9/2015 | Bloch | H04L 67/02 709/217 |
| 2016/0188527 | A1* | 6/2016 | Cherian | H04L 45/74 709/212 |
| 2016/0248628 | A1* | 8/2016 | Pandit | H04L 41/0806 |
| 2017/0052916 | A1* | 2/2017 | Kollu | G06F 13/4022 |

* cited by examiner

LOW LATENCY REMOTE DIRECT MEMORY ACCESS FOR MICROSERVERS

TECHNICAL FIELD

This disclosure relates in general to the field of communications and, more particularly, to low latency remote direct memory access (RDMA) for microservers.

BACKGROUND

Microservers are an emerging trend of servers for processing lightweight, scale out workloads for hyper-scale data centers with large numbers of relatively lightweight server nodes. The microserver represents a new server architecture characterized by many (e.g., tens or even hundreds) lightweight server nodes bundled together in a shared chassis infrastructure, for example, sharing power, cooling fans, and input/output components, eliminating space and power consumption demands of duplicate infrastructure components. The microserver topology facilitates density, lower power per node, reduced costs, and increased operational efficiency. Microservers are generally based on small form-factor, system-on-a-chip (SoC) boards, which pack processing capability, memory, and system input/output onto a single integrated circuit.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating low latency remote direct memory access (RDMA) for microservers is provided and includes generating queue pair (QPs) in a memory of an input/output (I/O) adapter of a microserver chassis having a plurality of compute nodes executing thereon, the QPs being associated with a RDMA connection between a first compute node and a second compute node in the microserver chassis, setting a flag (e.g., predefined bit or bit sequence) in the QPs to indicate that the RDMA connection is local to the microserver chassis, and performing a loopback of RDMA packets within the I/O adapter from one memory region in the I/O adapter associated with the first compute node of the RDMA connection to another memory region in the I/O adapter associated with the second compute node of the RDMA connection. As used herein, the term "compute node" refers to a hardware processing apparatus, in which user applications (e.g., software programs) are executed.

Example Embodiments

Figure 1:
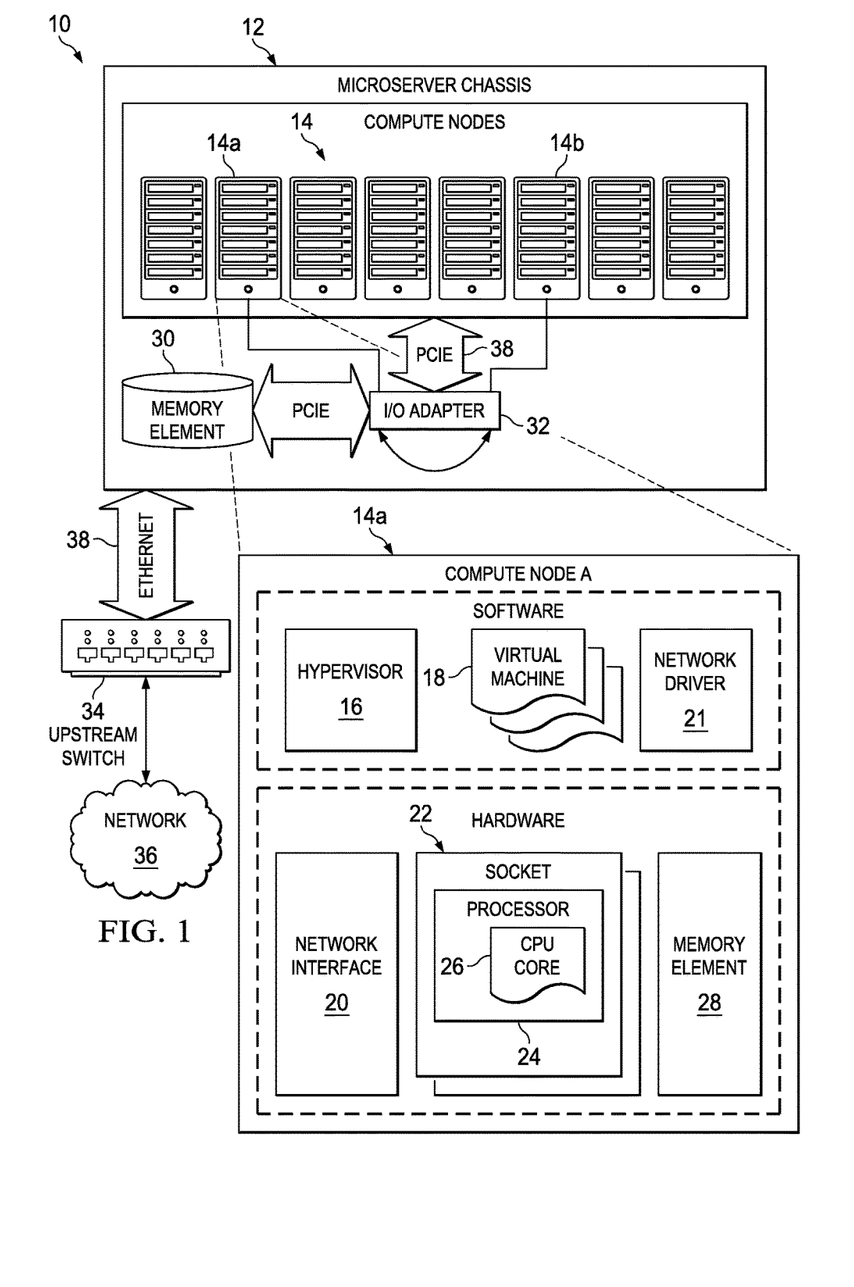
FIG. 1 is a simplified block diagram illustrating a communication system for facilitating low latency RDMA for microservers.

Turning to FIG. 1, FIG. 1 is a simplified block diagram illustrating a communication system 10 for facilitating low latency RDMA for microservers in accordance with one example embodiment. FIG. 1 illustrates a communication system 10 comprising a microserver chassis 12 comprising a plurality of compute nodes 14 that provide processing, memory, network and storage resources to run instances of various user applications, virtual machines, etc. In a general sense, compute nodes 14 hold (e.g., contain, host, etc.) computing resources; for example, compute node 14A runs a hypervisor 16 (including its associated driver) and various virtual machine instances 18, and can have one or more network interfaces 20 that enable network connectivity according to a network driver 21 (e.g., network driver 21 comprises a software implementation of network protocols, such as Ethernet, RDMA over Converged Ethernet, etc. and can be controlled by an operating system of compute node 14A to communicate over network interface 20). Note that network driver 21 may also execute inside an associated one of virtual machine instances 18.

In various embodiments, each of compute nodes 14 contains one or more sockets 22 (e.g., socket refers to a hardware receptacle that enables a collection of CPU cores with a direct pipe to memory); each socket holds one processor 24; each processor comprises one or more CPU cores 26; each CPU core executes instructions (e.g., computations, such as Floating-point Operations Per Second (FLOPS)); a memory element 28 may facilitate operations of CPU cores 26. In some embodiments, memory element 28 may comprise a portion of a common memory element 30 in microserver chassis 12. For example, a portion of memory element 30 may be reserved for compute node 14A, and the reserved portion may comprise memory element 28 of compute node 14A. In other embodiments, memory element 30 represents a logical collective memory of individual memory elements 28 of compute nodes 14.

A common input/output (I/O) adapter 32 facilitates communication to and from each of compute nodes 14. In various embodiments, I/O adapter 32 services both network and storage access requests from compute nodes 14 in microserver chassis 12, facilitating a cost efficient architecture. Shared I/O adapter 32 creates network and storage devices on a PCIE bus and presents them to compute nodes 14. An upstream switch 34 facilitates north-south traffic between compute nodes 14 and network 36.

In a general sense, network traffic between compute nodes 14 and network 36 may be termed as "North-South Traffic"; network traffic among compute nodes 14 may be termed as "East-West Traffic". Note that compute nodes 14 are unaware of the physical location of other compute nodes, for example, whether they exist in same microserver chassis 12, or are located remotely, over network 36. Thus, compute nodes 14 are agnostic to the direction of network traffic they originate or terminate, such as whether the traffic is North-South, or East-West because network driver 21 is typically unaware of the location of the peer node and uses the same addressing mechanism (e.g., L2 Ethernet MAC address/IP address) for addressing nodes located in same microserver chassis 12 or located in a remote node in same L2/L3 domain.

Irrespective of the direction of the network traffic, I/O adapter 32 presents a uniform interface to compute nodes 14 for both North-South traffic and East-West traffic. However, according to various embodiments, I/O adapter 32 intercepts East-West RDMA traffic in a manner agnostic to compute nodes 14 and uses a PCIe interconnect 38 to communicate the East-West traffic instead of sending it to switch 34. Embodiments of communication system 10 can facilitate a low latency, high speed RDMA interconnect for inter-node communication for microserver systems with zero impact to existing network stacks in compute nodes 14 and with zero impact to configuration and management of network end points (e.g., from the view point of a centralized unified computing system manager (UCSM)).

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Direct memory access (DMA) is an ability of a device to access local host memory directly, without the intervention of any CPU(s). RDMA is the ability of accessing (e.g., reading from or writing to) memory on a remote machine without interrupting the processing of the CPU(s) on the remote machine. RDMA enables data transfers between compute nodes 14 with minimal processor overhead and low latency. Hence, RDMA deployments are increasingly popular in modern data centers. RDMA is also being increasingly used in Hadoop™ and/or Big Data deployments, in which low latency is advantageous for Map Reduce and Remote Procedure Call (RPC) operations. Various distributed file systems like Ceph™ and GlusterFS™ can take advantage of RDMA for inter-node communication within a cluster of files. Windows® hypervisor prefers RDMA for live migration of virtual machines, as it is well-established that virtual machines can be migrated over RDMA enabled interconnects in short time with minimal processor utilization.

RDMA communication is based on a set of three queues: (i) a send queue and (ii) a receive queue, comprising a Queue Pair (QP) and (iii) a Completion Queue (CQ). Posts in the QP are used to initiate the sending or receiving of data. An application (e.g., driver) places instructions on its work queues that generate buffers in the adapter to send or receive data. The instructions comprise structures called work requests or Work Queue Elements (WQE) that include a pointer to the buffer (e.g., a WQE placed on the send queue contains a pointer to the message to be sent; a pointer in the WQE on the receive queue contains a pointer to a buffer where an incoming message can be placed). The adapter consumes WQE from the send queue at the egress side and streams the data from the memory region to the remote system. When data arrives at the remote system, the remote adapter consumes the WQEs at the receive queue at the ingress side and places the received data in appropriate memory regions. In case of RDMA SEND/RECV, the adapter uses the SEND/RECV operation to transfer control messages, which do not belong to any memory region. The SEND/RECV buffers are application provided buffers, comprising different memory spaces in adapter memory 44. RDMA can work over a network using one of three protocols: RDMA over Converged Ethernet (RoCE), Infiniband and Ethernet iWARP. For example, RoCE is a network protocol that allows RDMA over an Ethernet network, with encapsulation of RDMA primitives in Ethernet packets, such that the RDMA traffic is treated as any other Ethernet traffic.

In systems that do not include specialized I/O adapter 32 of communication system 10, any network traffic between compute nodes 14, say from compute node 14A to 14B, is typically sent outside microserver chassis 12, switched by upstream switch 34 and sent back to microserver chassis 12 to targeted compute node 14B. The disadvantages of such a traditional approach include the following. RDMA traffic between compute nodes 14 is treated as network traffic and incurs additional latency due to external switching; the network connectivity between I/O adapter 32 and external upstream switch 34 is shared across all compute nodes 14, such that the RDMA traffic has to share the available bandwidth with other network traffic, which can result in lower throughput and performance. Moreover, RoCE requires configuration of special quality of service (QoS) policy with no-drop enabled in upstream switch 34 and I/O adapter 32, resulting in reservation of buffers in I/O adapter 32 and switch 34 with per-priority flow control, and additional administrative burdens. Such disadvantages can be avoided if the RDMA traffic between compute nodes 14 in microserver chassis 12 does not leave the PCIe domain and enter into the Ethernet domain.

Communication system 10 is configured to address these issues (among others) to offer a system and method for facilitating low latency RDMA for microservers. Note that although various embodiments describe Reliable, Connection Oriented (RC) transport interface of RDMA, with some minor modifications known in the art, the described operations and systems can be applied to other transport types. According to various embodiments, I/O adapter 32 may receive an RDMA connection request between two compute nodes 14, say compute node 14A and compute node 14B.

I/O adapter 32 may determine that the source and destination nodes of the RDMA connection are located in the same local chassis as I/O adapter 32, namely, microserver chassis 12. The determination may trigger setting a local flag of queue pairs (QPs) of the connection generated in I/O adapter 32. Setting the local flag indicates execution of a specifically configured microcode routine in a packet classifier of I/O adapter 32, the specifically configured microcode routine being directed to RDMA communication between local compute nodes on microserver chassis 12. In a general sense, the term "microcode" refers to hardware-level instructions (e.g., circuit level operations) that implement higher-level machine code instructions or internal state machine sequence of instructions and are used for example, to read a data stream from a memory location, perform computations, and write the computation results to another memory location.

In various embodiments, a packet processor engine in I/O adapter 32 may execute the microcode routine. The microcode routine may force a loopback of packets (e.g., data) from an egress direct memory access (DMA) engine of I/O adapter 32 to an ingress packet classifier in I/O adapter 32, resulting in packets being directed from one memory region of I/O adapter 32 corresponding to the QP associated with compute node 14A to another memory region of I/O adapter 32 corresponding to another QP associated with compute node 14B. The packets never leave microserver chassis 12 and are confined to the PCIe domain thereof, resulting in lower latency and lossless communication. As used herein, the term "loopback" refers to a hardware or software operation that feeds a received data back to the sender, in this case, I/O adapter 32. A control processor in I/O adapter 32 may be notified of the completion of the RDMA operations, and may generate appropriate notification messages to compute nodes 14A and 14B.

Turning to the infrastructure of communication system 10, network topology of the network including microserver chassis 12 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, microserver chassis 12 may comprise a rack-mounted enclosure, blade enclosure, or a rack computer that accepts plug-in compute nodes 14. Note that microserver chassis 12 can include, in a general sense, any suitable network element, which encompasses computers, network appliances, servers, routers, switches, gateways, bridges, load-balancers, firewalls, processors, modules, or any other suitable device, component, element, or object operable to exchange information in a network environment. Moreover, the network elements may include any suitably configured hardware provisioned with suitable software, components, modules, interfaces, or objects that facilitate the operations thereof. This may be inclusive of appropriate algorithms and communication protocols that allow for the effective exchange of data or information.

Compute nodes 14 may comprise printed circuit boards, for example, manufactured with empty sockets. Each printed circuit board may hold more than one processor (e.g., within the same processor family, differing core counts, with a wide range of frequencies and vastly differing memory cache structures may be included in a single processor/socket combination). I/O adapter 32 may include an electronic circuit, expansion card or plug-in module that accepts input and generates output in a particular format. I/O adapter 32 facilitates conversion of data format and electronic timing between input/output streams and internal computer circuits of microserver chassis 12.

Figure 2:
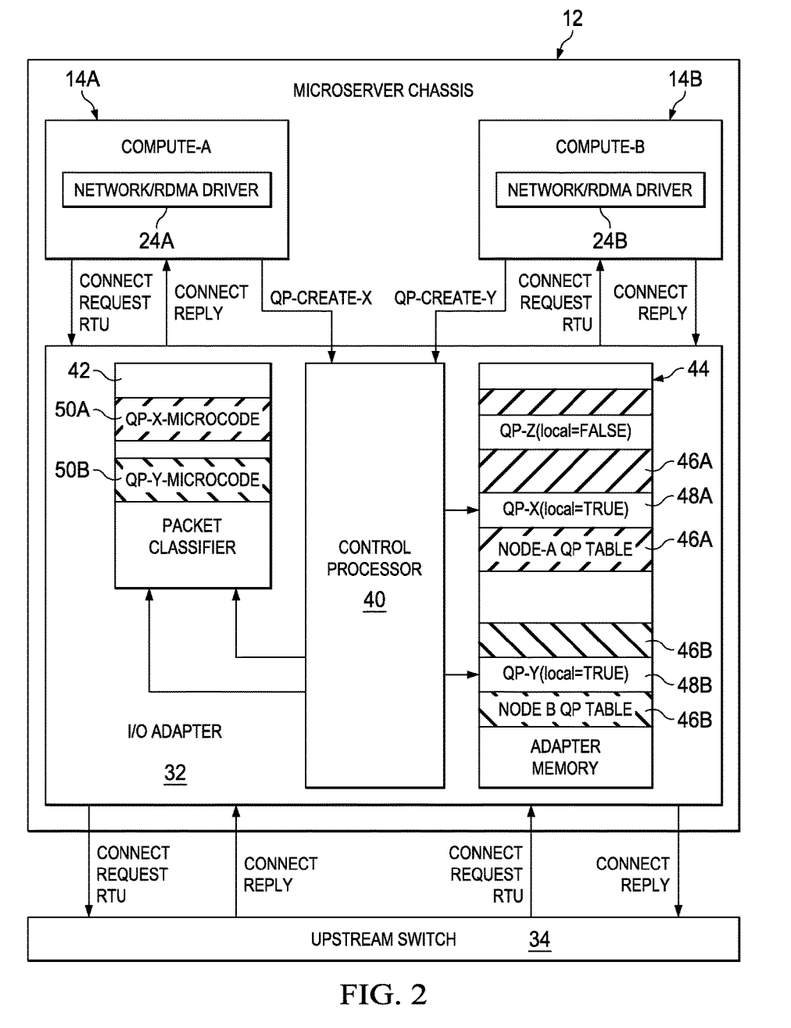
FIG. 2 is a simplified block diagram illustrating other example details of embodiments of the communication system.

Turning to FIG. 2, FIG. 2 is a simplified block diagram illustrating example details according to an embodiment of communication system 10. I/O adapter 32 includes a control processor 40, a packet classifier 42, and an adapter memory 44 for storing QPs. Adapter memory 44 may be partitioned into various memory spaces corresponding to QPs owned by various compute nodes 14 of microserver chassis 12. For example, a Node A QP table 46A may correspond to a memory space comprising QPs associated with compute node 14A; similarly, a Node B QP table 46B may correspond to another memory space comprising QPs associated with compute node 14B. Packet classifier 42 may include various microcode routines that may be executed on packet processor engines (e.g., on data path micro-processors (not shown)). The microcode routines may include instructions to lookup certain QPs and perform various operations pursuant to RDMA protocols. A match in a classification table of packet classifier 42 (e.g., based on the RDMA operation, and local flag setting) results in execution of a specific microcode for the relevant RDMA operation.

Assume that various command and data exchanges according to RDMA protocols (referred to herein as "RDMA traffic") is exchanged between compute nodes 14A and 14B in microserver chassis 12. According to RDMA protocols, the RDMA traffic between compute nodes 14A and 14B can be classified into: (i) connection phase; (ii) data transfer phase; and (iii) disconnection phase. In the connection phase, compute node 14A issues a connection request directed to the MAC address or IP address of the target compute node 14B. The connection request goes to upstream switch 34, which identifies the destination of the connection request (e.g., based on the MAC address or IP address) as compute node 14B, and forwards the connection request to compute node 14B. Network driver 24B in destination compute node 14B validates the connection request from compute node 14A and responds with a connect reply if the connection can be set up according to the connection request parameters received from compute node 14A. The connect reply is sent through upstream switch 34 back to compute node 14A.

In a general sense, compute nodes 14A and 14B do not know the physical location of the peer node (e.g., compute nodes 14B and 14A, respectively) and perform the RDMA operations irrespective of the physical location of the peer node. The operations may change slightly depending on the protocol used; for example, in case of RoCE V1, the MAC address of compute node 14B is used to establish the connection and in case of RoCE V2, the IP address of compute node 14B is used to establish the connection. However, I/O adapter 32 is aware of the physical location of various compute nodes 14 and can handle local RDMA traffic (East-West traffic) differently from remote RDMA traffic (North-South traffic) according to various embodiments.

In various embodiments, as part of the connection phase, network/RDMA driver 24A of compute node 14A instructs control processor 40 of I/O adapter 32 to generate a QP 48A (QP-X) in adapter memory 44 for RDMA I/O operations, such as READ (a section of memory on a compute node is read from), WRITE (a section of memory on a compute node is written to), or SEND/RECEIVE (the SEND operation allows sending data by a first compute node to a second compute node's receive queue; in the RECEIVE operation, the second compute node is notified that data has been received).

The instructions to generate QP-X also includes the destination MAC address of the target, namely compute node 14B. Control processor 40 generates QP 48A in Node A QP table 46A and associates QP 48A with the connection with compute node 14B. Further, because the destination MAC address corresponds to compute node 14B located in microserver chassis 12, control processor 40, which knows (unlike compute nodes 14) the physical locations of compute nodes 14, sets a context information (e.g., local flag) in QP 48A to indicate that QP 48A belongs to a local connection. In an example embodiment, the local flag may be set to TRUE to indicate a local connection (e.g., host and target are in same microserver chassis); the local flag may be set to FALSE to indicate a remote connection (e.g., host and target are in different microserver chassis).

Likewise, network/RDMA driver 24B of compute node 14B instructs control processor 40 of I/O adapter 32 to generate a QP 48B (QP-Y) in adapter memory 44. Control processor 40 generates QP 48B in Node B QP table 46B and associates QP 48B with the connection with compute node 14A. Control processor 40 sets the local flag in QP 48B to indicate that QP 48B belongs to a local connection.

In the data transfer phase, I/O adapter 32 loads microcode routine 50A indexed according to QP number corresponding to QP 48A. Microcode routine 50A comprises instructions to exchange control and application data (e.g., contents of application memory) using suitable channel semantics (e.g., SEND/RECV) or memory semantics (e.g., RDMA READ/WRITE) between QPs 48A and 48B. If the I/O operation specified by compute node 14A comprises a RDMA WRITE (e.g., or SEND) operation, microcode routine 50A instructs an egress direct memory access (DMA) engine in I/O adapter 32 to start DMA operation for compute node 14A. The DMA operation is directed to appropriate DMA engines based on the location of the target (e.g., compute node 14B) of the I/O operation. If the destination compute node is located in same microserver chassis 12, as is the case with compute node 14B, the I/O operation is directed to the ingress DMA engine present in same I/O adapter 32. If the destination compute node is not local, the data is sent over to external network 36.

On the ingress side, the incoming I/O operation hits packet classifier 42, which invokes another local microcode routine 50B to be executed. Based on the RDMA operation, appropriate memory lookup is performed and the host address where the DMA operation has to be performed is retrieved. If the I/O operation is RDMA WRITE, SEND operation or if destination compute node 14B is receiving a response to an RDMA READ operation, microcode routine 50B instructs the ingress DMA engine to transfer data into host memory of destination compute node 14B. After egress and ingress DMA engines complete their respective tasks, an appropriate notification is generated to control processor 40 on I/O adapter 32.

Software running on control processor 40 in I/O adapter 32 generates a command completion to the originator (e.g., compute node 14A) of the RDMA request. On the other hand, if the completed I/O operation was a SEND operation, compute node 14B receives notification when contents of QP 48A are transferred to QP 48B and then completely copied into compute node 14B's local memory element 28. According to various embodiments, local RDMA operations within microserver chassis 12 do not exit the PCIe domain; thus, there is no risk of loss of packets in any network, making acknowledgement packets (ACKs) according to RoCE specifications redundant.

In some embodiments, control processor 40 creates QP related entries in packet classifier 42. The entries in packet classifier 42 allows I/O adapter 32 to handle RDMA traffic related to each QP individually. Microcode routines can be associated with the packet classifier entries and they can be executed when RDMA packets originate from particular QPs or are destined to particular QPs.

In the disconnection phase, compute node 14A (or 14B) triggers a disconnect request, and the peer (e.g., compute node 14B or 14A) responds by sending a disconnect reply; thereupon both compute nodes 14A and 14B destroy their respective QPs associated with the connection and free up memory resources. In various embodiment, I/O adapter 32 deletes QP related information from packet classifier 42 and adapter memory 44.

Figure 3:
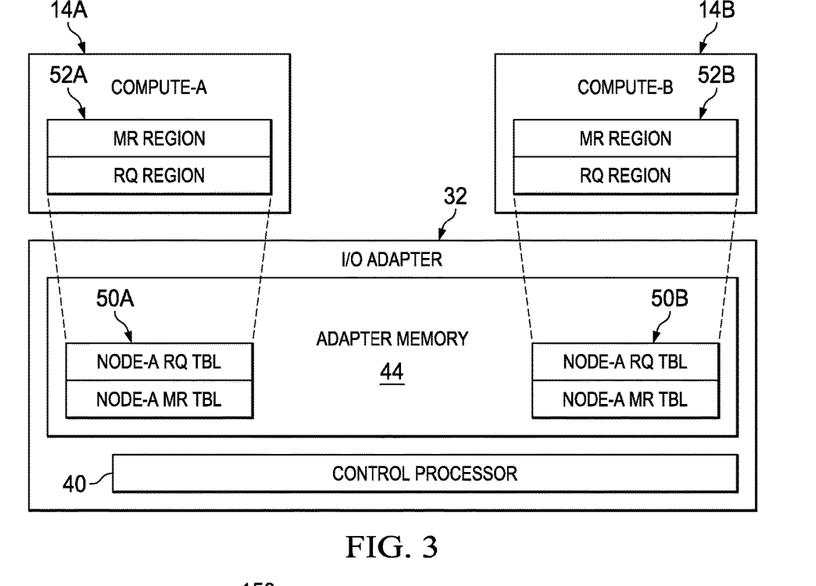
FIG. 3 is a simplified block diagram illustrating yet other example details of embodiments of the communication system.

Turning to FIG. 3, FIG. 3 is a simplified block diagram illustrating example details of the RDMA operations according to an embodiment of communication system 10. According to various embodiments, a user (e.g., administrator) can configure RDMA resources in I/O adapter 32 using a suitable network adapter policy. For example, RDMA resources (e.g., memory regions) can be allocated in adapter memory 44 of I/O adapter 32 based on a number of QPs and memory regions (MRs) requested for a particular network device, such as a virtual -) network interface card (VNIC). The resources may be allocated in adapter memory 44 during -VNIC creation time and exported to respective compute nodes 14 via a host-mapped memory in PCIe Base Address Registers (BARs). According to various embodiments, compute nodes 14 can post buffers or register memory region quickly, by just writing to its mapped memory.

For example, MR table (MR TBL) and Receive Queue (RQ) TBL 50A (e.g., generated in a format of a table that can be looked up) allocated in adapter memory 44 for compute node 14A may be mapped to MR region and RQ region 52A in a local memory element of compute node 14A. Content posted by compute node 14A in MR region and RQ region 52A may be substantially instantaneously associated with MR TBL and RQ TBL 50A in adapter memory 44, and vice versa. Likewise, MR TBL and RQ TBL 50B allocated in adapter memory 44 for compute node 14B may be mapped to MR region and RQ region 52B in a local memory element of compute node 14B. Content posted by compute node 14B in MR region and RQ region 52B may be substantially instantaneously associated with MR TBL and RQTBL 50B in adapter memory 44, and vice versa.

Figure 4:
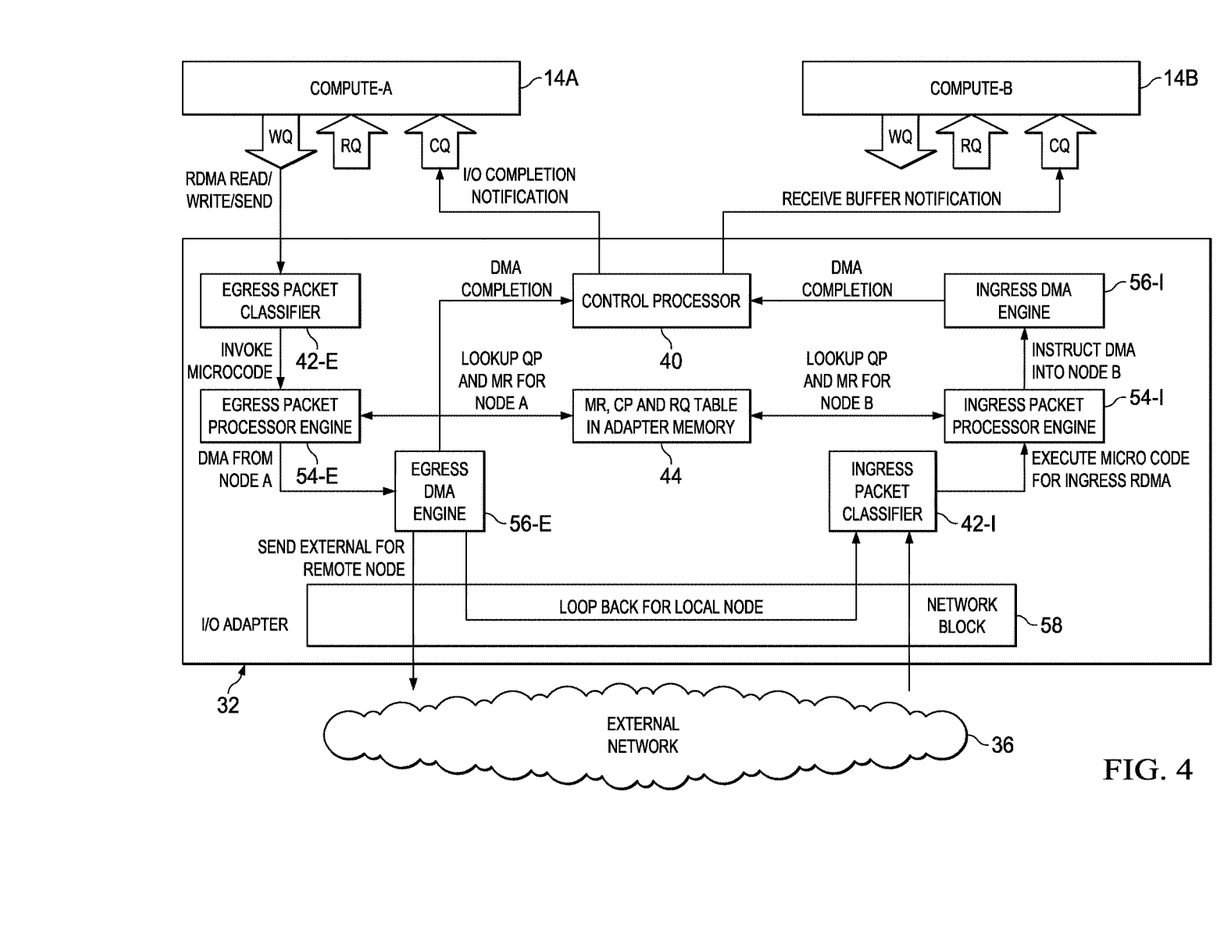
FIG. 4 is a simplified block diagram illustrating yet other example details of embodiments of the communication system.

Turning to FIG. 4, FIG. 4 is a simplified block diagram illustrating example details according to an embodiment of communication system 10. Compute node 14A wishing to perform RDMA I/O operation (e.g., SEND, WRITE, or READ) issues the appropriate I/O command on its work queue (WQ). The command on the WQ hits a pre-programmed classifier entry in egress packet classifier 42-E in I/O adapter 32. The command specifies the MAC address or IP address of target compute node 14B, which is on the same microserver chassis 12. Because the I/O operation is destined for a local node, an appropriate microcode routine (e.g., 50A) for local I/O operations is invoked (e.g., loaded) by egress packet classifier 42-E. The microcode routine executes on an egress packet processor engine 54-E, and retrieves information related to the current I/O operation from QP and MR tables dedicated to compute node 14A in adapter memory 44.

If the requested I/O operation is WRITE or SEND operation, the microcode routine also instructs an egress DMA engine 56-E to start DMA operations for compute node 14A. Because the destination node is located in the same microserver chassis 12, the I/O operation is directed to an ingress DMA engine 56-I present in the same I/O adapter 32. Egress DMA engine 56-E reads data from memory adapter 44. A network block 58 converts the retrieved data into RDMA packets and performs loopback of the RDMA packets to an ingress packet classifier 42-I, which invokes another local microcode routine (e.g., 50B) to be executed on ingress packet processor engine 54-I. Based on the I/O operation, appropriate MR and QP/RQ table lookup is performed in adapter memory 44 according to the microcode routine loaded by ingress packet processor engine 54-I.

The target host address where the DMA operation is to be performed is retrieved suitably. If the I/O operation is WRITE, SEND operation or if target compute node 14B is receiving a response to a previous READ operation, the microcode routine instructs ingress DMA engine 56-I to transfer the looped back data into host memory of compute node 14B. After egress DMA engine 56-E and ingress DMA engine 56-I complete their respective tasks, a notification is generated to control processor 40 on I/O adapter 32. Software executing on control processor 40 generates command completion notifications to compute node 14A or 14B, as the case may be depending on the specific I/O operation.

Figure 5:
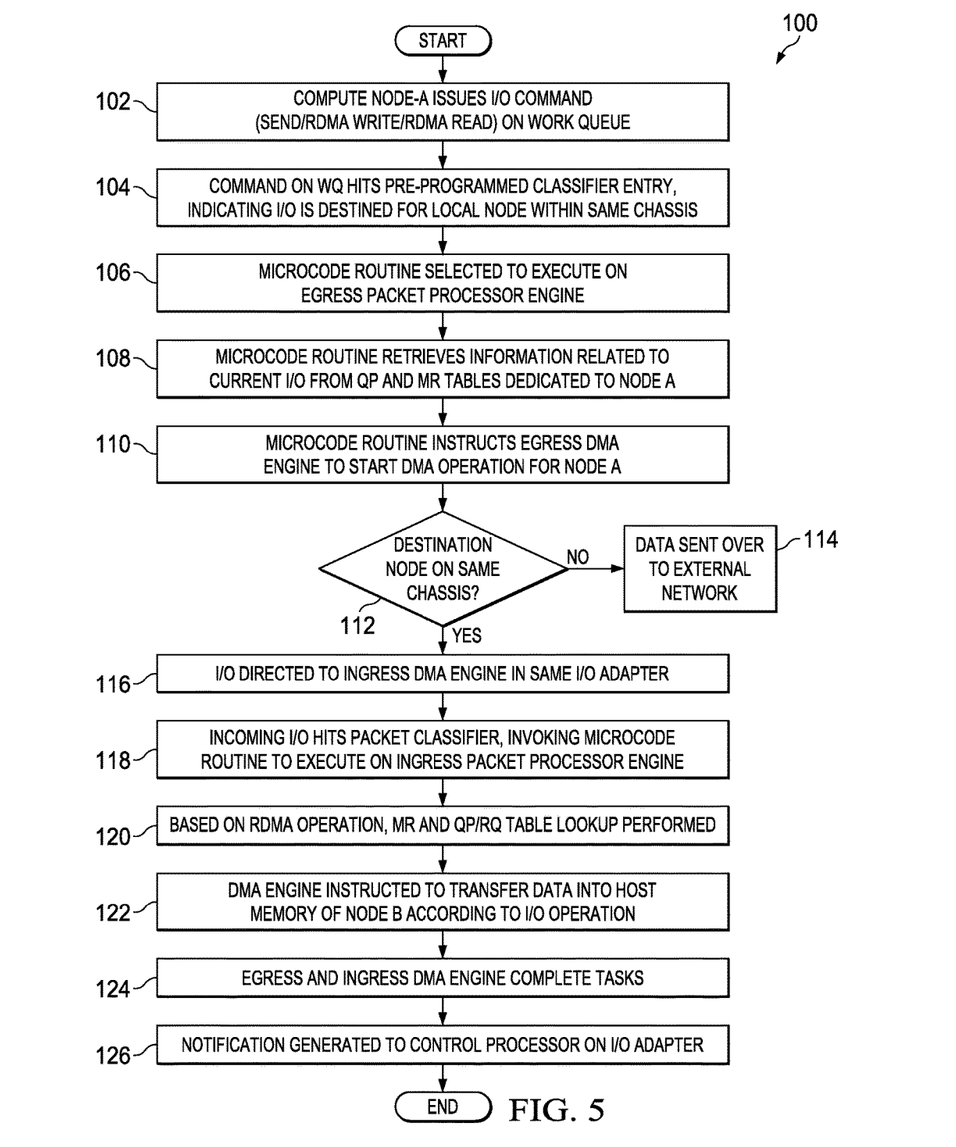
FIG. 5 is a simplified flow diagram illustrating example operations that may be associated with an embodiment of the communication system.

Turning to FIG. 5, FIG. 5 is a simplified flow diagram illustrating example operations 100 that may be associated with embodiments of communication system 10. At 102, compute node 14A, issues an I/O command (e.g., SEND, RDMA WRITE, RDMA READ, etc.) on its work queue. At 104, the command on the WQ hits a pre-programmed packet classifier entry in egress packet classifier 42-E in I/O adapter 32. The pre-programmed packet classifier entry parses through the command and indicates that the I/O operation is destined for a local node within same microserver chassis 12. Because the I/O operation is for local compute node 14B, at 106, local microcode routine 50A is selected to be executed on packet processor engine 54-E. At 108, microcode routine 50A executing on packet processor engine 54-E, retrieves information related to the current I/O operation from QP and MR tables dedicated to compute node 14A in adapter memory 44. At 110, microcode routine 50A also instructs egress DMA engine 56-E to start DMA operation for compute node 14A if the requested I/O operation was RDMA WRITE or SEND operation.

At 112, a determination is made if the destination node of the I/O operation is on same microserver chassis 12. If the destination node is not located in microserver chassis 12, at 114, the data retrieved from adapter memory 44 by egress DMA engine 56-E is sent to external network 36 (e.g., over upstream switch 34). If the destination node is located in same microserver chassis 12, at 116, the I/O operation is looped back and directed to ingress DMA engine 56-I present in I/O adapter 32.

At 118, the incoming I/O hits ingress packet classifier 42-I, which invokes another microcode routine to be executed on ingress packet processor engine 54-I. At 120, based on the RDMA operation, appropriate MR and QP/RQ table lookup in adapter memory 44 associated with compute node 14B is performed. At 122, ingress DMA engine 56-I is instructed to transfer data into host memory of compute node 14B according to the I/O operation (e.g., the I/O operation comprises RDMA WRITE, SEND operation or compute node 14B is receiving response to a previous RDMA READ operation). At 124, egress DMA engine 56-E and ingress DMA engine 56-I complete their respective tasks. At 126, an appropriate notification is generated to control processor 40 on I/O adapter 32.

Figure 6:
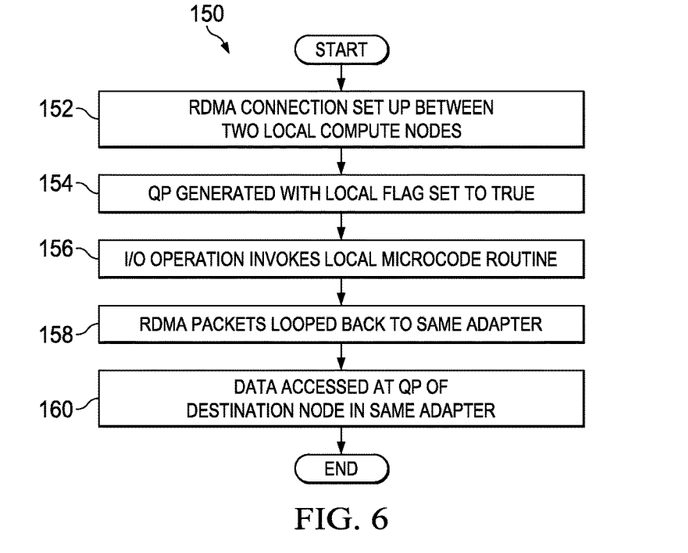
FIG. 6 is a simplified flow diagram illustrating other example operations that may be associated with an embodiment of the communication system.

Turning to FIG. 6, FIG. 6 is a simplified flow diagram illustrating example operations 150 that may be associated with embodiments of communication system 10. At 152, an RDMA connection may be set up between local compute nodes 14, say 14A and 14B. At 154, QP 48A and 48B are generated in adapter memory 44 with local flag set to indicate that the destination QP is associated with a local compute node. At 156, the RDMA I/O operation invokes a local microcode routine in egress packet classifier 42-E in I/O adapter 32. At 158, the local microcode routine instructs egress network block 58 to loopback the RDMA packets (e.g., data from the appropriate memory regions in adapter memory 44 that have been accessed by egress DMA engine 56-E) to ingress packet classifier 42-I in I/O adapter 32, without sending the packets external to microserver chassis 12. At 160, the data is accessed at QP 48B corresponding to compute node 14B in adapter memory 44.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, I/O adapter 32. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, I/O adapter 32 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., adapter memory 44) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., control processor 40) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   generating queue pairs (QPs) in a memory of an input/output (I/O) adapter of a microserver chassis having a plurality of compute nodes executing thereon, the QPs being associated with a remote direct memory access (RDMA) connection, based on an RDMA protocol, between a first compute node and a second compute node in the microserver chassis;
   setting a flag in the QPs to indicate that the RDMA connection is local to the micro server chassis;
   performing, in response to the flag, a loopback of RDMA packets within the I/O adapter from one memory region in the I/O adapter associated with the first compute node of the RDMA connection to another memory region in the I/O adapter associated with the second compute node of the RDMA connection, without sending the RDMA packets external to micro server chassis;
   wherein an egress direct memory access (DMA) engine performs a lookup of the memory region in the I/O adapter associated with the first compute node of the RDMA connection according to a first microcode routine associated with an I/O operation as loaded by the second compute node and retrieves data according to the I/O operation; and
   wherein an ingress DMA engine writes the data in the RDMA packets into the another memory region in the I/O adapter associated with the second compute node of the RDMA connection according to a second microcode routine loaded by an ingress packet classifier.

2. The method of claim 1, further comprising executing a microcode routine in the I/O adapter specifically configured to process RDMA packets between local compute nodes in the microserver chassis.

3. The method of claim 2, wherein the microcode routine is indexed in a packet classifier according to a QP number.

4. The method of claim 1, wherein the I/O adapter presents a uniform interface to compute nodes executing in the microserver chassis for north-south traffic from and to the microserver chassis and east-west traffic between the compute nodes.

5. The method of claim 4, wherein the north-south traffic is directed by the I/O adapter to an upstream switch connecting to an external network.

6. The method of claim 1, wherein an egress packet classifier receives an I/O operation from the first compute node to transfer data to the second compute node according to a WRITE or SEND operation, wherein an egress packet processor engine executes the first microcode routine, wherein a network block converts the retrieved data into the RDMA packets and performs loopback of the RDMA packets to an ingress packet classifier in the I/O adapter.

7. The method of claim 6, wherein the ingress packet classifier loads a second microcode routine to process the RDMA packets according to the I/O operation, wherein an ingress packet processor engine executes the second microcode routine.

8. The method of claim 7, wherein a control processor in the I/O adapter is notified when the egress DMA engine and the ingress DMA engine complete their respective tasks.

9. The method of claim 8, wherein the control processor sends a completion notification to the first compute node and a receive buffer notification to the second compute node.

10. The method of claim 1, wherein each compute node comprises one or more hardware processors, and hosts one or more virtual machines.

11. Non-transitory tangible media that includes instructions for execution, which when executed by a processor of a network element, is operable to perform operations comprising:
    generating QPs in a memory of an I/O adapter of a microserver chassis having a plurality of compute nodes executing thereon, the QPs being associated with a RDMA connection, based on an RDMA protocol, between a first compute node and a second compute node in the micro server chassis;
    setting a flag in the QPs to indicate that the RDMA connection is local to the micro server chassis; and
    performing, in response to the flag, a loopback of RDMA packets within the I/O adapter from one memory region in the I/O adapter associated with the first compute node of the RDMA connection to another memory region in the I/O adapter associated with the second compute node of the RDMA connection, without sending the RDMA packets externa l to micro server chassis;
    wherein an egress direct memory access (DMA) engine performs a lookup of the memory region in the I/O adapter associated with the first compute node of the RDMA connection according to a first microcode routine associated with an I/O operation as loaded by the second compute node and retrieves data according to the I/O operation; and
    wherein an ingress DMA engine writes the data in the RDMA packets into the another memory region in the I/O adapter associated with the second compute node of the RDMA connection according to a second microcode routine loaded by an ingress packet classifier.

12. The media of claim 11, wherein the I/O adapter presents a uniform interface to compute nodes executing in the microserver chassis for north-south traffic from and to the microserver chassis and east-west traffic between the compute nodes.

13. The media of claim 11, wherein an egress packet classifier receives an I/O operation from the first compute node to transfer data to the second compute node according to a WRITE or SEND operation, wherein an egress packet processor engine executes the first microcode routine, wherein a network block converts the retrieved data into the RDMA packets and performs loopback of the RDMA packets to an ingress packet classifier in the I/O adapter.

14. The media of claim 13, wherein the ingress packet classifier loads a second microcode routine to process the RDMA packets according to the I/O operation, wherein an ingress packet processor engine executes the second microcode routine.

15. The media of claim 11, wherein each compute node comprises one or more hardware processors, and hosts one or more virtual machines.

16. An apparatus, comprising: a plurality of compute nodes;
    an I/O adapter;
    a physical memory for storing data; and
    a processor, wherein the processor executes instructions associated with the data, wherein the processor and the physical memory cooperate, such that the apparatus is configured for:
    generating QPs in a memory of the I/O adapter, the QPs being associated with a RDMA connection, based on an RDMA protocol, between a first compute node and a second compute node in the apparatus;
    setting a flag in the QPs to indicate that the RDMA connection is local to the apparatus; and
    performing, in response to the flag, a loopback of RDMA packets within the I/O adapter from one memory region in the I/O adapter associated with the first compute node of the RDMA connection to another memory region in the I/O adapter associated with the second compute node of the RDMA connection, without sending the RDMA packets external to micro server chassis;
    wherein an egress direct memory access (DMA) engine performs a lookup of the memory region in the I/O adapter associated with the first compute node of the RDMA connection according to a first microcode routine associated with an I/O operation as loaded by the second compute node and retrieves data according to the I/O operation; and
    wherein an ingress DMA engine writes the data in the RDMA packets into the another memory region in the I/O adapter associated with the second compute node of the RDMA connection according to a second microcode routine loaded by an ingress packet classifier.

17. The apparatus of claim 16, wherein the I/O adapter presents a uniform interface to the plurality of compute nodes for north-south traffic from and to the apparatus and east-west traffic between the compute nodes.

18. The apparatus of claim 16, wherein an egress packet classifier receives an I/O operation from the first compute node to transfer data to the second compute node according to a WRITE or SEND operation, wherein an egress packet processor engine executes the first microcode routine, wherein a network block converts the retrieved data into the RDMA packets and performs loopback of the RDMA packets to an ingress packet classifier in the I/O adapter.

19. The apparatus of claim 18, wherein the ingress packet classifier loads a second microcode routine to process the RDMA packets according to the I/O operation, wherein an ingress packet processor engine executes the second microcode routine.

20. The apparatus of claim 16, wherein each compute node comprises one or more hardware processors, and hosts one or more virtual machines.

* * * * *